US010876581B2

(12) United States Patent
Carlino

(10) Patent No.: US 10,876,581 B2
(45) Date of Patent: Dec. 29, 2020

(54) WEDGE CLUTCH WITH SLOTTED CARRIER

(71) Applicant: SCHAEFFLER TECHNOLOGIES AG & CO. KG, Herzogenaurach (DE)

(72) Inventor: Ryan Carlino, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 99 days.

(21) Appl. No.: 16/225,676

(22) Filed: Dec. 19, 2018

(65) Prior Publication Data
US 2020/0200225 A1 Jun. 25, 2020

(51) Int. Cl.
| F16D 41/08 | (2006.01) |
| F16D 13/16 | (2006.01) |
| F16D 15/00 | (2006.01) |
| F16D 11/06 | (2006.01) |
| F16D 11/16 | (2006.01) |
| F16D 41/07 | (2006.01) |
| F16D 23/12 | (2006.01) |

(52) U.S. Cl.
CPC .............. *F16D 15/00* (2013.01); *F16D 11/06* (2013.01); *F16D 11/16* (2013.01); *F16D 13/16* (2013.01); *F16D 41/076* (2013.01); *F16D 41/082* (2013.01); *F16D 2023/123* (2013.01)

(58) Field of Classification Search
CPC ............. F16D 41/06–082; F16D 15/00; F16D 2023/123; F16D 27/10; F16D 27/102; F16D 43/18; F16D 13/10; F16D 13/16; F16D 11/16
See application file for complete search history.

(56) References Cited

U.S. PATENT DOCUMENTS

| 3,437,185 A * | 4/1969 | Daugherty ............ F16D 41/082 |
| | | 192/26 |
| 3,476,226 A * | 11/1969 | Massey ................. F16D 41/088 |
| | | 192/27 |
| 9,933,023 B2 * | 4/2018 | Hemphill .............. F16D 41/063 |
| 2014/0231208 A1 * | 8/2014 | Lee ........................ F16D 21/00 |
| | | 192/48.5 |
| 2018/0180110 A1 * | 6/2018 | Lee ........................ F16D 15/00 |
| 2019/0219105 A1 * | 7/2019 | Ohr ........................ F16D 15/00 |

(Continued)

FOREIGN PATENT DOCUMENTS

| DE | 102016210104 B3 | 7/2017 |
| DE | 102016222450 A1 | 5/2018 |

*Primary Examiner* — Ernesto A Suarez
*Assistant Examiner* — Lillian T Nguyen
(74) *Attorney, Agent, or Firm* — Brooks Kushman P.C.

(57) ABSTRACT

A wedge clutch includes first and second races supported for rotation about a common axis. The first race defines a cam surface and circumferentially arranged pockets recessed into the cam surface. A wedge element is formed of circumferentially arranged wedges each having an ear disposed in one of the pockets. Resilient members are disposed in the pockets and act between the ears to bias the wedge element to a contracted position in which the wedge elements collectively contract towards the axis and the clutch is engaged. A cage is axial movable towards the wedge element to engage with the ears to compress the resilient members and move the wedge element to an expanded position in which the wedge elements collectively expand away from the axis and the clutch is disengaged.

19 Claims, 4 Drawing Sheets

(56) References Cited

U.S. PATENT DOCUMENTS

2020/0040950 A1\* 2/2020 Lee ..................... F16D 41/082
2020/0063860 A1\* 2/2020 Lee ..................... F16H 61/14
2020/0094313 A1\* 3/2020 Lee ..................... F16D 41/073
2020/0096052 A1\* 3/2020 Lee ..................... F16D 11/16

\* cited by examiner

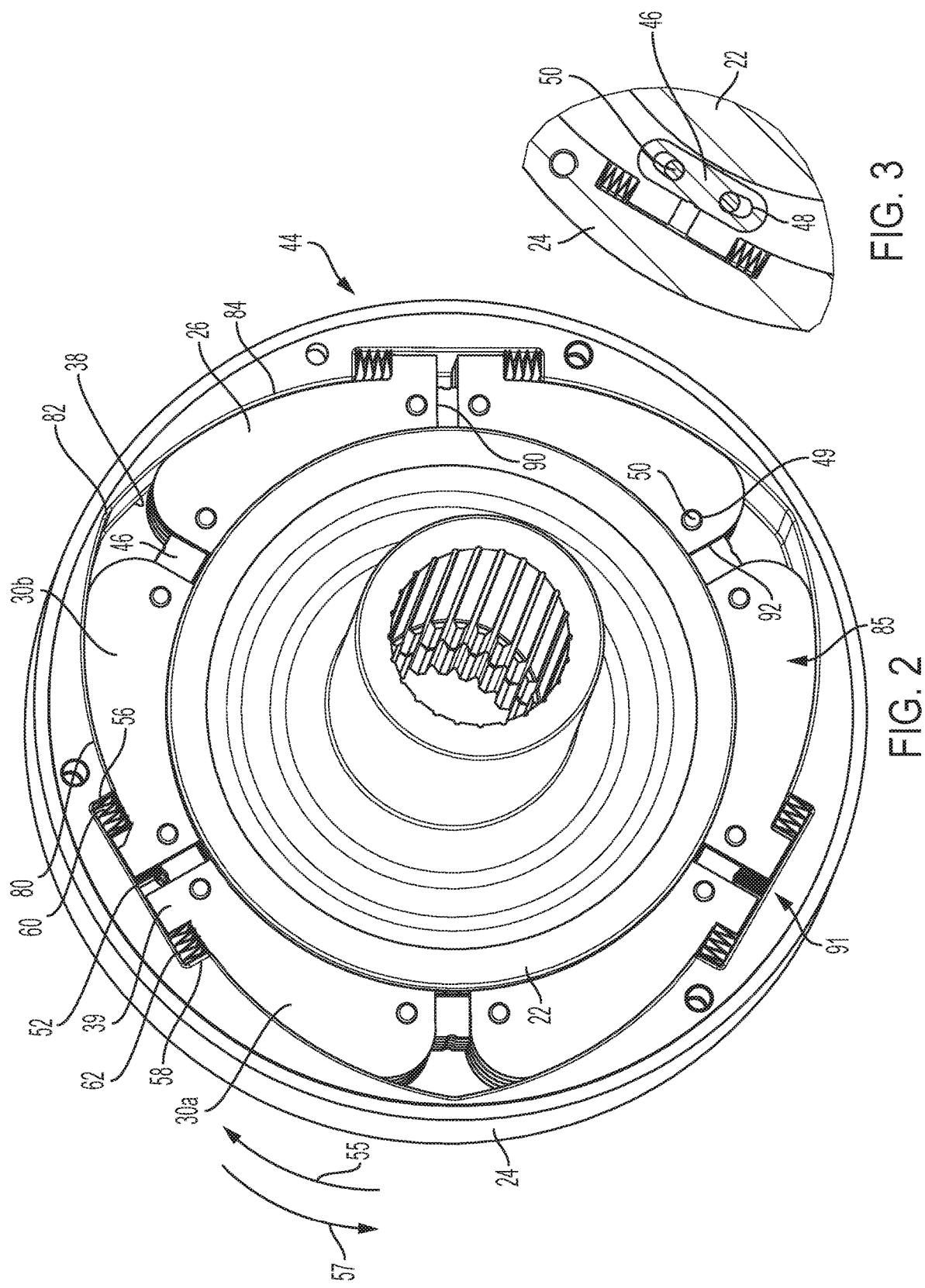

WEDGE CLUTCH WITH SLOTTED CARRIER

TECHNICAL FIELD

The present disclosure relates to wedge clutches.

BACKGROUND

A clutch is a component used to selectively couple two or more components such as rotatable shafts. The clutch may be engaged to couple the components and disengaged to decouple the components. One type of clutch is a wedge clutch. A wedge clutch may include an inner race connected to a shaft and an outer race connected to another shaft. A wedge plate is radially disposed between the inner and outer races and is configured to couple the inner and outer races when the clutch is engaged to transmit power from one shaft to the other.

SUMMARY

According to one embodiment, a wedge clutch includes first and second races supported for rotation about a common axis. The first race defines a cam surface and circumferentially arranged pockets recessed into the cam surface. A wedge element is formed of circumferentially arranged wedges each having an ear disposed in one of the pockets. Resilient members are disposed in the pockets and act between the ears to bias the wedge element to a contracted position in which the wedge elements collectively contract towards the axis and the clutch is engaged. A cage is axial movable towards the wedge element to engage with the ears to compress the resilient members and move the wedge element to an expanded position in which the wedge elements collectively expand away from the axis and the clutch is disengaged.

According to another embodiment, a wedge clutch includes an inner race and an outer race that defines an internal cam surface and circumferentially arranged pockets recessed into the cam surface. A wedge element includes a plurality of arcuate wedges each having a ramp conforming in shape with the cam surface and an ear extending radially outward from the ramp. The wedges are arranged in pairs and are circumferentially disposed around the inner race such that the ramps nest with the cam surface and the ears of each of the pairs are disposed in a same one of the pockets. Movement of the wedges of each pair towards each other contracts the wedge element to an engageable state and movement of the wedges of each pair away from each other expands the wedge element to a disengaged state. Resilient members are disposed in the pockets and act between the ears and the outer race to bias the wedges of each pair towards each other.

According to yet another embodiment, a wedge clutch includes a carrier defining an internal cam surface and circumferentially arranged pockets recessed into the cam surface. A hub is supported for rotation within the carrier. A clutch element is radially disposed between the carrier and the hub and is configured to couple the carrier and the hub when the clutch is engaged and to permit relative rotation between the carrier and the hub when the clutch is disengaged. The clutch element is comprised of a plurality of circumferentially arranged wedges encircling the hub and is configured to nest with the cam surface. Resilient members are disposed in the pockets with each resilient member acting between the carrier and a corresponding one of the wedges to bias the wedges onto the hub.

BRIEF DESCRIPTION OF THE DRAWINGS

FIG. 2 is a partial front perspective view of the wedge clutch in a locked mode.

FIG. 3 is a partial cross-sectional view of the wedge clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many vehicles and other applications require selective coupling of two or more members such as shafts, gears, transmissions, torque converters, electric motors, and the like. A clutch is a mechanism configured to selectively couple two or more members. The clutch may couple a pair of rotating members, or may couple a rotating member to a stationary member, in which case the clutch is commonly referred to as a brake. In one example application, the clutch may be used in a hybrid vehicle to disconnect an internal-combustion engine from a hybrid transmission. Of course, the clutch may be used in a variety of other applications.

Figure 1:
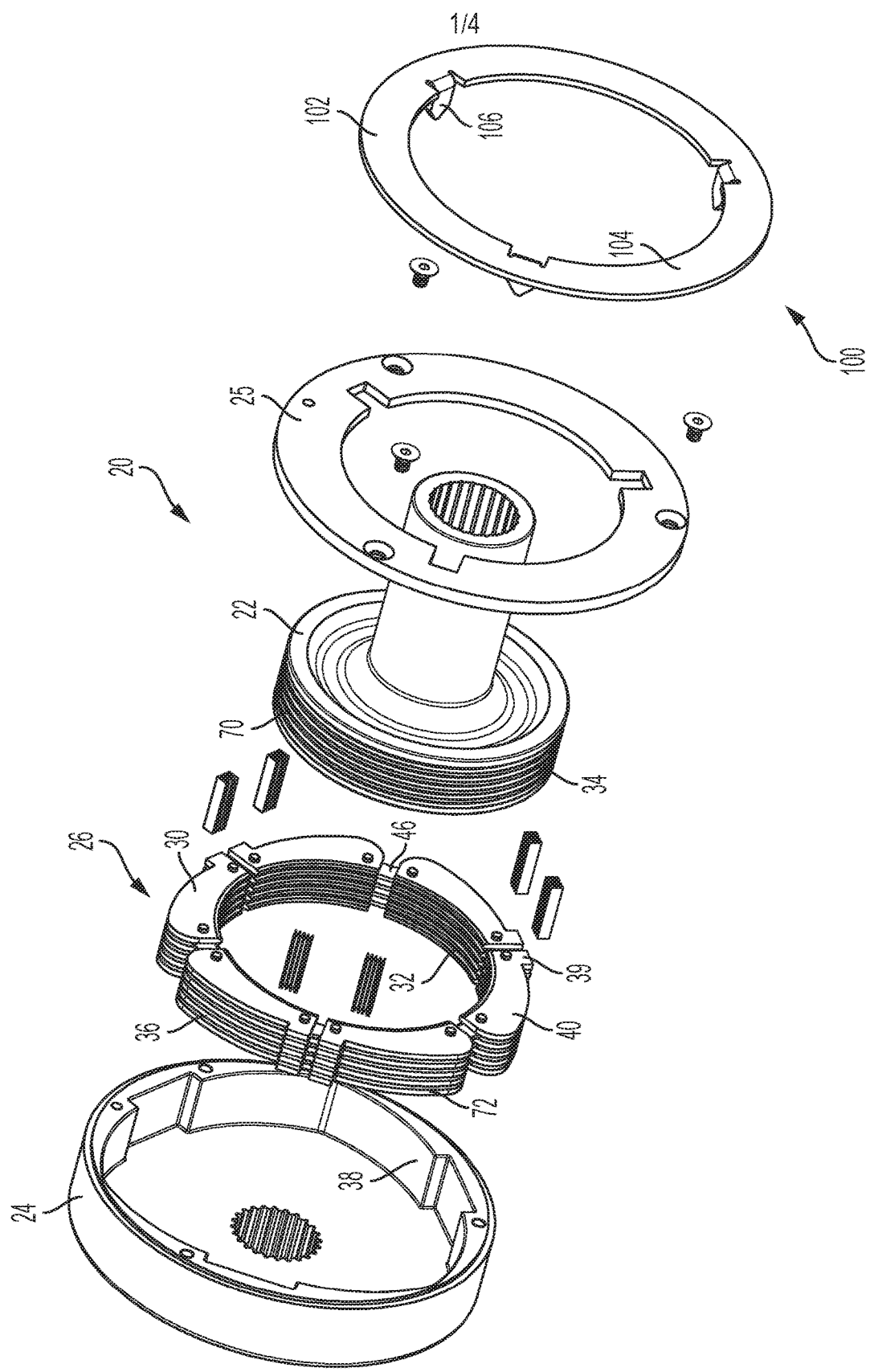
FIG. 1 is an exploded perspective view of a wedge clutch.

Referring to FIGS. 1, 2, and 3, a clutch 20, which is known as a wedge clutch, may be used to couple two or more components. The clutch 20 includes an inner race 22 (also known as a hub) and an outer race 24 (also known as a carrier). A wedge element 26 is radially disposed between the inner and outer races 22, 24 and is configured to selectively couple the races. The clutch 20 may include a plurality of modes that couple and decouple the races 22, 24 in a variety of relative directions of rotation. For example, a bidirectional embodiment of the clutch 20 may include a fully locked mode (also known as lock-lock mode) in which the races 22, 24 are coupled in both rotational directions and may include an unlocked mode (also known as open mode) in which the races 22, 24 are completely decoupled. The clutch 20 may be biased to the fully locked mode or the unlocked mode. In some embodiments, the clutch may be a one-way clutch that includes at least one one-way mode (also known as lock-free mode) in which the races 22, 24 are coupled in a first rotational direction and are decoupled, i.e., overrun, in a second rotational direction that is opposite the first. The one-way clutch may include two one-way modes so that the overrunning direction can be switched to suit current operating conditions and may include an unlocked mode (also known as open mode) in which the races 22, 24 are completely decoupled. The clutch 20 may be biased to the fully locked mode, a one-way mode, or the unlocked mode. The specific modes offered, and the bias of the clutch, can be modified to suit specific applications. The clutch 20 is capable of offering all of the above described modes when suitably combined with the correct actuator and control logic. The hardware illustrated in FIG. 1 is a bidirectional clutch that includes a fully locked mode (engaged state shown in FIG. 2) and an unlocked mode (disengaged state shown in FIG. 4).

The clutch 20 may be supported in a housing (not shown) that is attachable to a support structure such as a vehicle chassis or other fixed member. The inner and outer races 22, 24 may be supported for concentric rotation within the housing about a common axis. The housing may define a seat that receives a roller bearing that in turn supports the outer race 24 for rotation within the housing. The outer race 24 may be connectable to a rotating member, or alternatively a stationary member, via a spline connection, fasteners, press-fit, or the like. Similarly, the inner race 22 is connectable to a rotating member, or alternatively a stationary member, via a spline connection, fasteners, press-fit, or the like. The wedge element 26 is radially disposed between the inner and outer races 22, 24 and is configured to couple and decouple the inner and outer races 22, 24. A cover 25 secures the wedge element 26 and the inner race 22 within the outer race 24.

The wedge element 26 includes a plurality of individual wedges 30 that cooperate to couple and decouple the inner and outer races 22, 24. The wedges 30 may be generally arcuate as shown in the illustrated embodiment. To facilitate manufacturability of the clutch 20, the individual wedges 30 may be assembled as a chain. Assembling the wedge element 26 as a chain holds the individual wedges 30 in place while the wedge element 26 is installed on the inner and outer races. The chain 26 is wrapped around the inner race 22 to place the wedges 30 circumferentially around the inner race 22. The wedges 30 may be equally spaced.

Each wedge 30 has a circular inner diameter 32 that substantially matches the outer diameter 34 of the inner race 22 and an outer side 36 that is ramped (outer side may be referred to as a ramp), to conform with the shape of an internal cam surface 38 formed on the outer race 24, causing the wedges 30 to taper in height along the arcuate direction of the wedge 30. The wedges 30 include ears 39 the extend radially outward from the outer side 36. Each wedge 30 may include a single segment or a stack of multiple axially spaced segments 40 as shown in the illustrated embodiment. Spacers may be interleaved with the segments but are not required and are not included in the illustrated embodiment. In the illustrated embodiment, each wedge 30 includes five segments 40 but may include more or less segments in other embodiments.

The wedges 30 are arranged in pairs that form sections 44 of the chain 26. Each section 44 includes a wedge 30a that is in a first orientation and a second wedge 30b that is in a second orientation. The wedges 30a may be referred to as a first set, and the wedges 30b may be referred to as a second set. The first and second sets of wedges alternate along the length of the chain 26 and around the circumference of the inner race 22 when installed.

The wedges 30 are interconnected to each other by links 46. The links 46 are designed to allow a certain degree of movement between the wedges 30. For example, the links 46 allow pivotal and circumferential movement between the wedges 30. The links 46 may include pins 50 that extend through slots 48 defined in the links 46. Multiple links 46 may connected between adjacent wedges if the wedges 30 include multiple segment. The links 46 may be interleaved with the wedges 30 and act as spacers. The slot 48 may be elongated in the circumferential direction to facilitate the circumferential movement of the wedges 30. The wedges 30 define holes 49 that the pins 50 extend through.

The inner race 22 may have a plurality of axially spaced circular grooves 70 defined in the outer diameter 34. The grooves 70 are spaced to match the axial spacing of the segments 40 in the wedges 30. Each of the grooves 70 receives a corresponding one of the rows 72 of segments 40 of the wedge element 26. That is, the wedge element 26 is wrapped around the outer diameter 34 so that the inner surfaces (inner edge) 74 of the segments 40 are received within the grooves 70. The grooves 70 and the inner surfaces 74 are designed to frictionally lock with each other when the clutch 20 is engaged.

The internal cam surface 38 includes lobes 80 and valleys 82 arranged with the lobes 80. The lobes 80 are the radially inner-most portion of the cam surface 38 and the valleys 82 are the radially outer-most portion of the cam surface 38. Ramps 84 each extend between adjacent ones of the lobes 80 and the valleys 82. Each set of ramps 84, lobes 80, and valleys 82 collectively defines a generally wedge-shaped pocket 85 in the outer race 24 for receiving one of the wedges 30.

Each of the wedges 30 is seated in one of the pockets 85 with the outer side facing a ramp 84, a short end 90 facing a lobe 80, and a tall end 92 facing a valley 82. The outer side 36 is ramped to match the ramps 84 so that the wedges 30 can slide along the cam surface 38. The wedges 30 may be biased towards the lobes 80. The outer ramped side 36 collectively define a discontinuous outer cam surface of the wedge element 26 when wrapped around the inner race 22. The discontinuous outer cam surface conforms in shape with the cam surface 38 of the outer race. The orientations of the wedges 30a and 30b alternate along a length of the chain 26 such that placements of the tall ends 92 and the short ends 90 of adjacent ones of the wedges 30 are flipped. That is, the wedges 30a and 30b are mirrored over a radially extending axis.

The outer race 24 defines pockets 52 recessed into the cam surface 38. Each pocket 52 receives the ears 39 of a corresponding one of the sections 44. The links 46 hold the wedges 30a and 30b apart so that there is a gap 91 between the ears 39. Each pocket 52 defines a pair of opposing radial walls 56 and 58. In each pocket there is a first resilient member 60 acting between the ear 39 of the wedge 30b and the first wall 56 and a second resilient member 62 acting between the ear 39 of the wedge 30a and the second wall 58. The resilient members 60, 62 may be springs. The wedges 30a and 30b biased towards each other via the resilient members 60, 62 so that the wedge element 26 is contracted onto the inner race 22, i.e., the wedge element 26 is biased to the contracted position. The contracted position corresponds to an engageable state of the clutch 20 and thus, the clutch 20 is in the fully locked mode by default. Sliding the wedges 30a and 30b away from each other expands the wedge element to disengage the clutch 20.

The clutch 20 operates by wedging the wedges 30 into the inner race 22 to create a friction coupling. The wedges 30 are biased toward the lobes 80 by the resilient members 60, 62. This creates friction between the wedges 30 and the inner race 22, which causes the wedges 30 to decelerate relative to the outer race 24 and further slide in a wedging direction of the cam surface 38 when power is applied to the clutch 20. That is, at least some of the decelerating wedges 30 ride down the ramps 84 increasing the friction between the wedges 30 and the inner race 22 to create a friction coupling sufficient to lock the inner and outer race 22 to the wedge element 26. The cam surface 38 is shaped so that the wedges 30 cannot pass over the lobes 80 to lock the outer race 24 to the wedge element 26. This creates a power flow path through the clutch 20 so that power can be selectively transferred between the components attached to the races 22, 24.

The wedges 30a, 30b cooperate with the cam surface 38 to selectively couple the inner and outer races 22, 24 depending upon the positions of the wedges 30a, 30b on the cam surface 38. The wedge element 26 is configured to allow movement between the wedges 30 allowing the different sets of wedges 30a, 30b to be in different locations on the cam surface 38. Each set of the wedges is responsible for coupling the inner and outer races 22, 24 in one of the rotational directions. For example, the first set of wedge 30a can prevent the inner race 22 from rotating in a first direction 55 relative the outer race 24, and the second set of wedges 30b can prevent the inner race 22 from rotating in a second direction 57 relative the outer race 24 depending upon the location of the wedges 30 on the inner cam surface 38.

Figure 4:
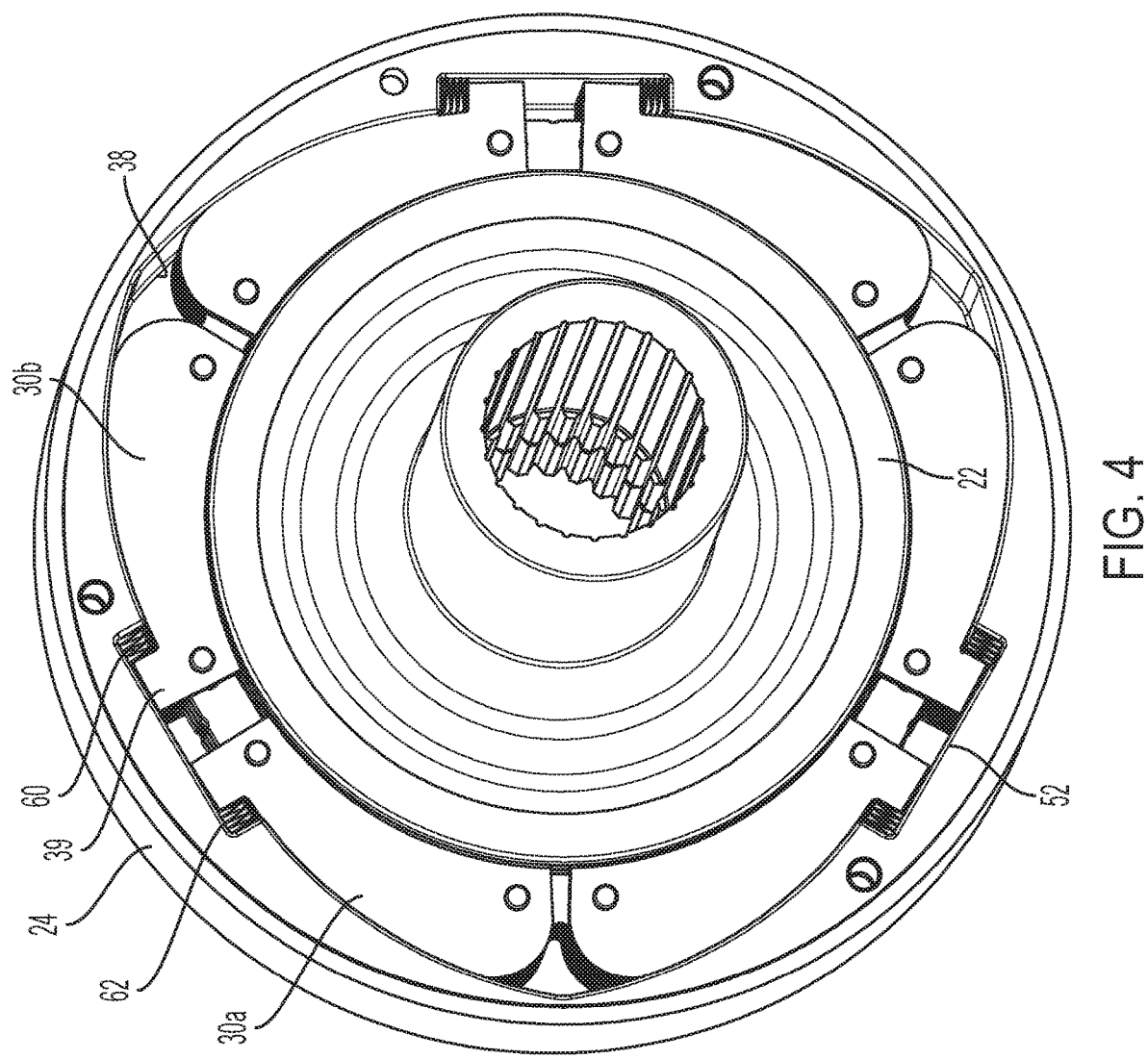
FIG. 4 is a partial front perspective view of the wedge clutch in an unlocked mode.

Referring to FIGS. 2 and 4, an example will now be described to explain operation of the clutch 20 in the fully locked mode. Assume that the outer race 24 is attached to the driving shaft and the inner race 22 is attached to the driven shaft. The wedges 30a prevent the inner race 22 from rotating in the first direction 55 relative to the outer race 24 as the drag force between the wedges 30a and the inner race 22 causes the ramps 84 and the outer side 36 to ride up each other to create sufficient friction between the wedges 30a and the inner race 22 to lock the inner race 22 to the outer race 24. Similarly, the wedges 30b prevent the inner race 22 from rotating in the second direction 57 relative to the outer race 24. Thus, the wedge 30 cooperate to lock the inner race 22 to the outer race 24 in both directions. The clutch 20 may be fully disengaged by moving the wedges 30a, 30b towards the valleys 82 to reduce the friction force between the wedges 30a, 30b and the inner race 22 to a nominal amount. This is shown in FIG. 4.

If the clutch 20 is enabled as a one-way clutch, the clutch 20 may be switched from the fully locked mode to a one-way mode by circumferentially moving only one set of the wedges towards the valleys 82. For example, driving the wedges 30b towards the valleys 82 decreases or eliminates the friction between the wedges 30b and the inner race 22 so that the inner race 22 can overrun in the second direction 57. A second one-way mode can be achieved by releasing the wedges 30b and driving the wedges 30a towards the valleys 82 to decrease or eliminate the friction between the wedges 30a and the inner race 22 so that the inner race 22 can overrun in the first direction 55.

Figure 5:
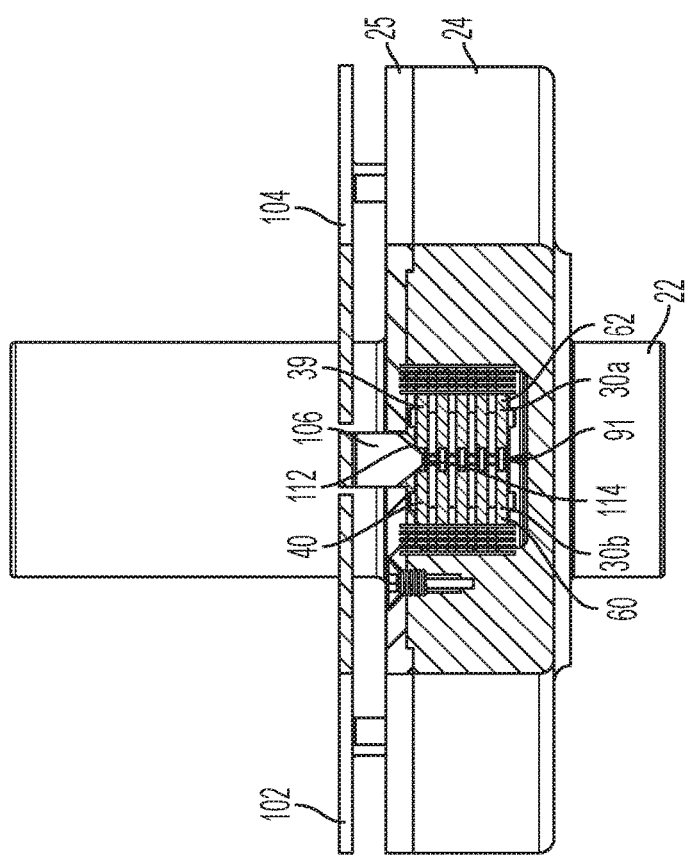
FIG. 5 is a cross sectional view of the wedge clutch in the locked mode.

Referring to FIGS. 1 and 5, the wedges 30 may be controlled by an actuator 100. A variety of different actuators may be used including electromagnetic, hydraulic, pneumatic, and mechanical. The actuator is configured to engage with the ears 39 to move one or more sets of the wedges 30 independently or simultaneously. The actuator 100 may include an annular cage 102 that includes a circular body 104 and a plurality of fingers 106 that extend axially from the body 104. The fingers 106 are circumferentially and radially arranged to line up with the ears 39 so that the fingers 106 can be inserted between the gaps 91 to move the wedges 30 relative to the cam surface 38. The design of the fingers 106 and the operation of the cage 102 may vary based on whether the clutch 20 is a bidirectional clutch or one-way clutch.

Figure 6:
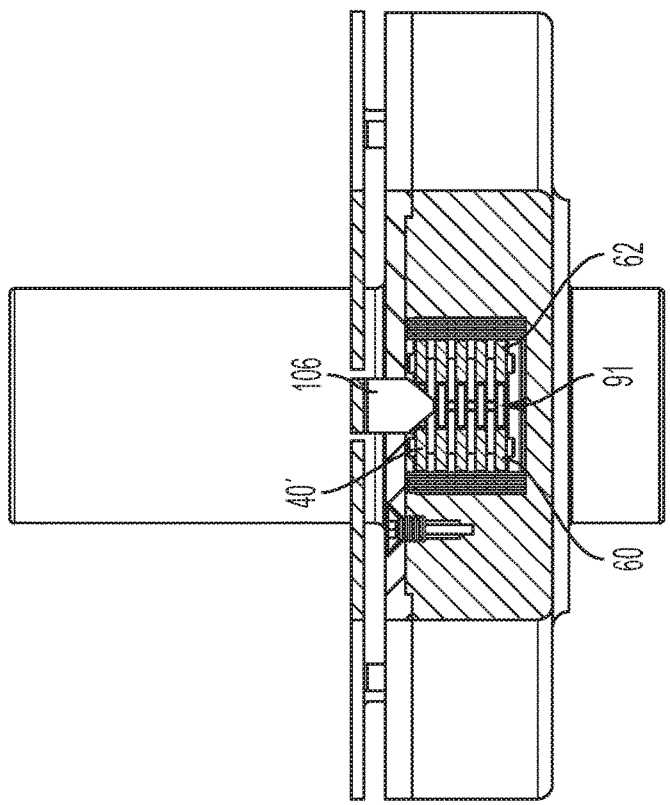
FIG. 6 is a cross sectional view of the wedge clutch in the unlocked mode.

In the illustrated bidirectional clutch 20, which has a fully engaged mode and a disengaged mode, the fingers 106 are designed to engage the ears 39 of both wedges 30a, 30b of the pair 44 simultaneously. Each of the fingers 106 may include opposing tapered sides 112 to form a tip 114 having a width that is less than the circumferential distance between the ears 39 so that the tip 114 can be disposed within the gap without engaging the wedges 30. The wedges 30 may be actuated by axially sliding the cage 102 relative to the wedge element 26. The clutch 20 is placed in the locked mode by retracting the cage 102 to disengage with the ears 39 so that the resilient members 60, 62 bias the wedges 30 to contract the wedge element 26 onto the inner race 22. Sliding the cage 102 towards the wedge element 26 wedges the fingers 106 between the ears 39 to expand the wedge element 26 and disengage the clutch 20 (See FIG. 6). The tapered sides 112 engage with the ears 39 to urge them apart. The fingers 106 may only engage with some of the segments 40 of the wedges 30. For example, FIG. 5 illustrates the cage 102 in the fully actuated position in which the fingers 106 only engage with the outermost segments 40.

The cage 102 may be slid by other components of the actuator 100. Applicant's U.S. patent application Ser. No. 16/037,457, filed Jul. 17, 2018 describes example actuators configured to axially slide a cage and is incorporated in its entirety by reference herein.

A one-way embodiment of the clutch 20 may include an actuator configured to rotate one set of wedges at a time. The actuator may include fingers that are disposed between the ears. The fingers may be mounted to a cage and included as part of the clutch. The cage may be rotated relative to the outer race to circumferential move some of the wedges via the fingers to engage and disengage the wedges with the inner race. Applicant's U.S. patent application Ser. No. 16/050,782, filed Jul. 31, 2018, describes examples of this type of actuator and is incorporated in its entirety by reference herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of element, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST clutch 20
inner race 22
outer race 24
20 clutch
22 inner race
24 outer race
25 cover
26 wedge element
30 wedge
32 inner diameter
34 outer diameter
36 outer side
38 cam surface
39 ear
40 segment
44 section
46 link
48 slots
49 hole
50 pin
52 pocket
55 first direction
56 first wall
57 second direction
58 second wall
60 resilient member
62 resilient member
70 grooves
72 rows
74 inner surface
80 lobe
82 Valley
84 ramp
85 pocket
90 short end
91 gap
92 tall end
100 actuator
102 annular cage
104 body
106 finger
112 tapered side
114 tip

What is claimed is:

1. A wedge clutch comprising:
first and second races supported for rotation about a common axis, the first race defining a cam surface and circumferentially arranged pockets recessed into the cam surface;
a wedge element formed of circumferentially arranged wedges each having an ear disposed in one of the pockets;
resilient members disposed in the pockets and acting between the ears to bias the wedge element to a contracted position in which the wedge elements collectively contract towards the axis and the clutch is engaged; and
a cage axial movable towards the wedge element to engage with the ears to compress the resilient members and move the wedge element to an expanded position in which the wedge elements collectively expand away from the axis and the clutch is disengaged.

2. The wedge clutch of claim 1, wherein the cage including fingers configured to engage with the ears.

3. The wedge clutch of claim 2, wherein the fingers each include at least one tapered side, wherein the tapered sides are engageable with the ears.

4. The wedge clutch of claim 1, wherein the wedges are arranged in pairs with the ears of each pair disposed in a same one of the pockets, wherein the cage includes fingers each corresponding with one of the pairs and configured to wedge between the ears of the pair to urge the wedges of the pair away from each other when the cage moves towards the wedge element to disengage the clutch.

5. The wedge clutch of claim 4, wherein the pockets define opposing radial walls, wherein each of the ears includes a first side engaging with one of the fingers and a second side engaging with one of the resilient member that acts between the second side and a corresponding one of the radial walls.

6. The wedge clutch of claim 4, wherein the fingers have tapered sides.

7. The wedge clutch of claim 1, wherein the wedge element includes links interconnected between the wedges such that the wedges are circumferentially movable relative to each other.

8. The wedge clutch of claim 1, wherein each of the wedges includes a plurality of axial stacked segments each including an inner edge.

9. The wedge clutch of claim 8, wherein the second race defines axially spaced circular grooves each receiving one of the inner edges therein.

10. The wedge clutch of claim 1, wherein the first race is a carrier and the second race is a hub supported for rotation within the carrier.

11. A wedge clutch comprising:
an inner race;
an outer race defining an internal cam surface and circumferentially arranged pockets recessed into the cam surface;
a wedge element including a plurality of arcuate wedges each having a ramp conforming in shape with the cam surface and an ear extending radially outward from the ramp, the wedges being arranged in pairs and circumferentially disposed around the inner race such that the ramps nest with the cam surface and the ears of each of the pairs is disposed in a same one of the pockets, wherein movement of the wedges of each pair towards each other contracts the wedge element to an engageable state and movement of the wedges of each pair away from each other expands the wedge element to a disengaged state; and
resilient members disposed in the pockets and acting between the ears and the outer race to bias the wedges of each pair towards each other.

12. The wedge clutch of claim 11 further comprising an actuator having features insertable between the ears of each of the pairs to urge the wedges of each pair away from each other.

13. The wedge clutch of claim 12, wherein the actuator includes an annular cage having the features circumferentially arranged thereon.

14. The wedge clutch of claim 12, wherein the features are fingers.

15. The wedge clutch of claim 14, wherein the fingers define at least one tapered side.

16. The wedge clutch of claim 11, wherein each of the wedges includes a plurality of axial stacked segments.

17. A wedge clutch comprising:
a carrier defining an internal cam surface and circumferentially arranged pockets recessed into the cam surface;
a hub supported for rotation within the carrier;
a clutch element radially disposed between the carrier and the hub and configured to couple the carrier and the hub when the clutch is engaged and to permit relative rotation between the carrier and the hub when the clutch is disengaged, the clutch element being comprised of a plurality of circumferentially arranged wedges encircling the hub and configured to nest with the cam surface; and
resilient members disposed in the pockets with each resilient member acting between the carrier and a corresponding one of the wedges to bias the wedges onto the hub
wherein each of the wedges defines an ear that is disposed in a corresponding one of the pockets and is in contact with a corresponding one of the resilient members.

18. The clutch of claim 17 further comprising an actuator having features insertable between the wedges to disengage the clutch.

19. The clutch of claim 18, wherein the actuator includes an annular cage having the features circumferentially arranged thereon.

* * * * *